(12) United States Patent
Rinholm et al.

(10) Patent No.: US 8,136,334 B2
(45) Date of Patent: Mar. 20, 2012

(54) REEL MOWER CUTTING UNIT WITH GAUGE WHEELS

(75) Inventors: Brent G. Rinholm, Fuquay-Varina, NC (US); Tracy T. Lanier, Garner, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/707,013

(22) Filed: Feb. 17, 2010

(65) Prior Publication Data

US 2011/0197562 A1 Aug. 18, 2011

(51) Int. Cl.
*A01D 34/53* (2006.01)

(52) U.S. Cl. .................................. 56/249; 56/7; 56/294

(58) Field of Classification Search ................ 56/7, 322, 56/249, 294
See application file for complete search history.

(56) References Cited

U.S. PATENT DOCUMENTS

| 1,767,510 | A | * | 6/1930 | Carlson ........................... 56/11.5 |
| 2,968,906 | A | | 1/1961 | Grimes |
| 2,972,218 | A | * | 2/1961 | Benson ........................... 56/15.3 |
| 3,668,847 | A | | 6/1972 | Van Ausdall |
| 3,824,772 | A | | 7/1974 | Sorenson et al. |
| 4,162,605 | A | * | 7/1979 | Olin et al. ........................... 56/7 |
| 5,228,277 | A | * | 7/1993 | Smith et al. .................... 56/16.9 |
| 5,533,326 | A | * | 7/1996 | Goman et al. ...................... 56/7 |

OTHER PUBLICATIONS

European Search Report Oct. 25, 2011, 4 pages.

* cited by examiner

*Primary Examiner* — Alicia Torres

(57) ABSTRACT

A reel mower cutting unit having a cutting reel with a horizontal axis is supported by a front roller and a rear roller in a mowing position. A lift arm may raise and lower the cutting reel between a mowing position and a transport position. A pair of gauge wheels are mounted forwardly of the front roller at a front left corner and a right front corner of the unit. If the unit is lowered to a sloped surface, the gauge wheel contacts the surface and prevents the unit from marking or damaging the turf.

12 Claims, 2 Drawing Sheets

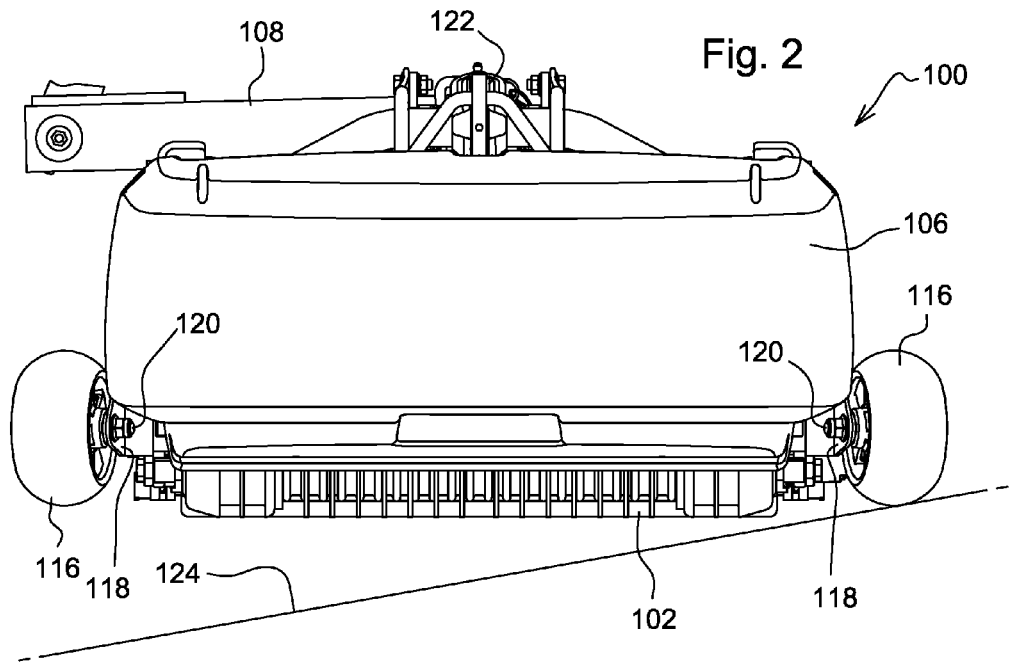
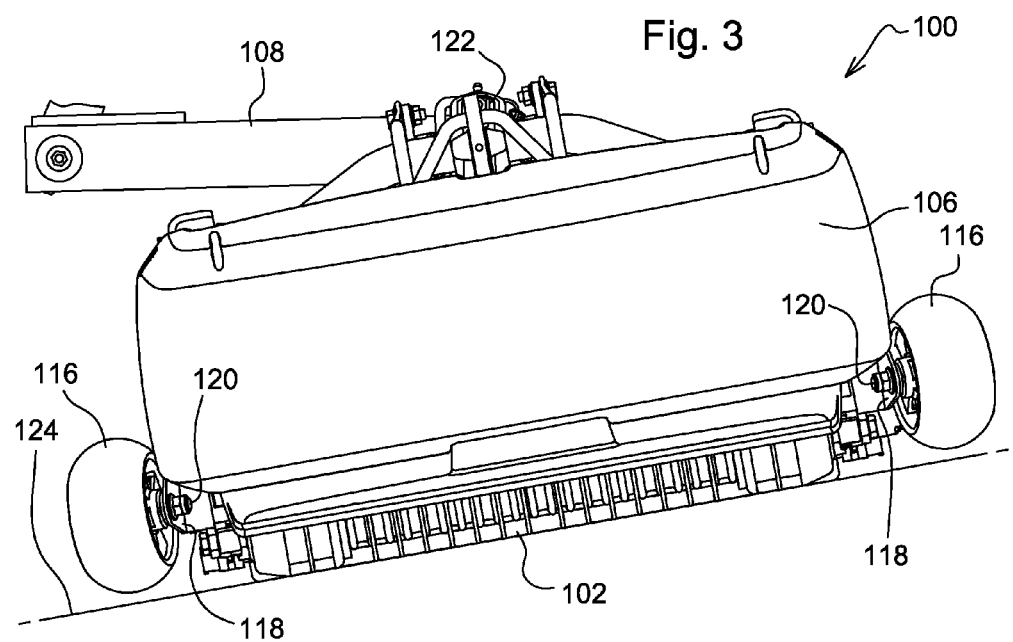

REEL MOWER CUTTING UNIT WITH GAUGE WHEELS

FIELD OF THE INVENTION

This invention relates generally to reel mower cutting units, and particularly to a reel mower cutting unit with gauge wheels to prevent marks or damage to the turf when the unit is lowered onto a sloped surface.

BACKGROUND OF THE INVENTION

Grass mowing machines such as greens mowers, fairway mowers and trim mowers are commonly equipped with several reel mower cutting units to provide a high quality of cut for golf courses. Each reel mower cutting unit may have a generally horizontally-aligned cutting reel, and front and back rollers or caster wheels that roll in contact with the ground for supporting the unit during operation. Blades of the rotating reel interact with a bedknife to cut grass with a scissoring action. Each reel mower cutting unit may be attached to the outer end of a lift arm extending laterally outwardly from a traction vehicle.

These machines may include implement lift systems to raise and lower the cutting units on the outer ends of the lift arms. Implement lift systems for mower cutting units may include hydraulic cylinders connected to the lift arms, or electric motors driving linear actuators. For example, a hydraulic cylinder attached to a lift arm may be extended to raise a cutting unit to a transport or service position, and retracted to lower the cutting unit to a mowing position. Examples of grass mowing machines with hydraulic implement lift systems for mower cutting units are provided in U.S. Pat. Nos. 5,297,378 and 5,343,680. Examples of grass mowing machines having electric implement lift systems for mower cutting units are shown in U.S. Pat. Nos. 5,540,037 and 5,553,445.

As the implement lift system lowers a reel mower cutting unit onto a sloped surface of a golf course, the first part of the unit to touch the ground may leave a mark on the turf. Additionally, the left or right side of a reel mower cutting unit may damage the turf as the unit slides sideways after one side reaches the ground surface. It is desirable to prevent marks caused by lowering reel mower cutting units onto sloped surfaces of a golf course, and to prevent damage to the turf as the unit slides sideways after one side reaches the ground surface.

SUMMARY OF THE INVENTION

A reel mower cutting unit includes a horizontally aligned cutting reel rotating in proximity to a bedknife, a front roller forwardly of the cutting reel and a rear roller behind the cutting reel to support the cutting reel on the ground surface, and a pair of gauge wheels mounted to the reel mower cutting unit forwardly of the front roller. Each of the pair of gauge wheels have an axis that is non-parallel to the cutting reel. The gauge wheels prevent marks when the reel mower cutting unit is lowered onto sloped surfaces, and prevent damage to the turf.

BRIEF DESCRIPTION OF THE DRAWINGS

FIG. 2 is a front view of a reel mower cutting unit with gauge wheels contacting a sloped ground surface before other parts of the unit reach the surface, according to a first embodiment of the invention.

FIG. 3 is a front view of a reel mower cutting unit with gauge wheels after the cutting unit reaches the ground surface according to a first embodiment of the invention.

DESCRIPTION OF THE PREFERRED EMBODIMENT

Figure 1:
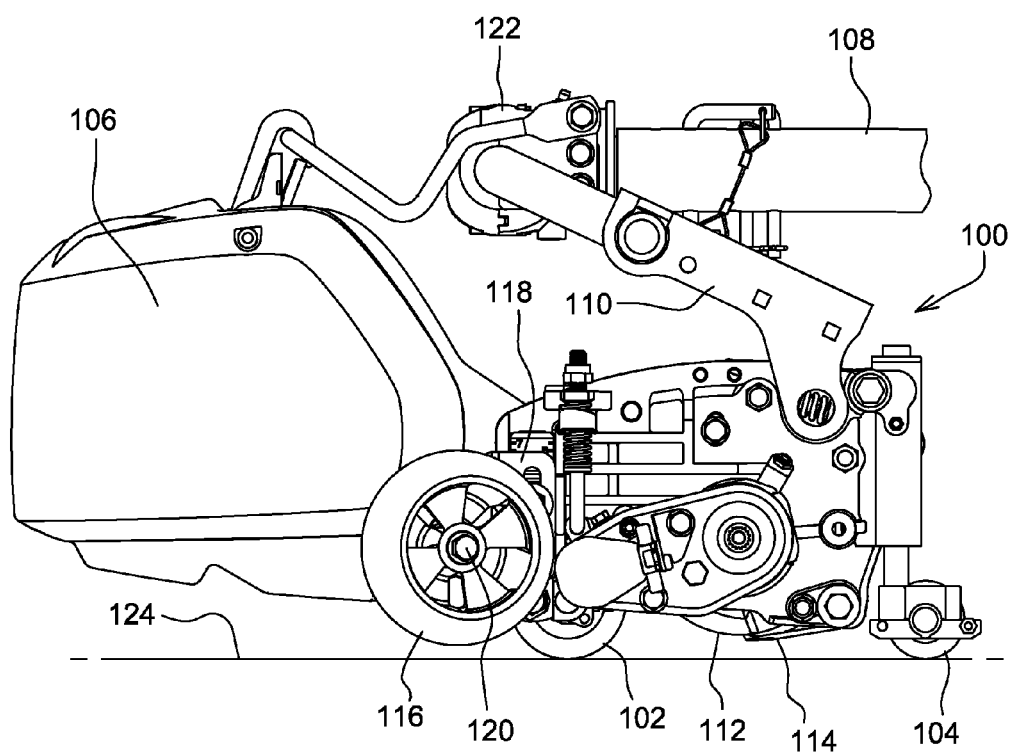
FIG. 1 is a side view of a reel mower cutting unit with gauge wheels according to a first embodiment of the invention.

In a preferred embodiment shown in FIGS. 1-3, reel mower cutting unit 100 may have a generally cylindrical cutting reel 112 mounted in a frame and rotatable on a laterally extending horizontal axis. The cutting reel includes spiral blades which pass in close proximity to bed knife 114, cutting grass with a shearing action. Each cutting unit may have a cutting width of about 18 inches to about 36 inches. Grass catcher 106 may be removably attached to the front of the reel mower cutting unit.

In one embodiment, reel mower cutting unit 100 may be in a row of two or three reel-type cutting units carried by a traction vehicle. For example, the reel mower cutting unit may be on a fairway mower, greens mower, trim mower or other grass mowing machine having one or more reel mower cutting units that may be raised and lowered to the ground surface.

In the mowing position, the reel mower cutting unit may be supported by front roller 102 and rear roller 104. Alternatively, one or more casters may support the reel mower cutting unit, instead of front and/or rear rollers. The front and rear rollers or casters may be supported by brackets mounted to the reel mower cutting unit frame, and the brackets may be adjustable vertically for raising and lowering the cutting unit frame with respect to the rollers to adjust the height at which grass is cut.

In one embodiment, reel mower cutting unit 100 may be carried by lift arm 108 extending from a traction vehicle. The lift arm may raise and lower the reel mower cutting unit between a mowing position and a transport position. A first or inner end of the lift arm may be pivotably attached to the frame or body of the traction vehicle, and the second or outer end of the lift arm may be pivotably attached to the reel mower cutting unit at knuckle joint 122 pivotably connected to cross bar or yoke 110 supporting the unit. The knuckle joint allows the reel mower cutting unit to pivot or tilt on a horizontal axis in the direction of travel. The reel mower cutting unit should be balanced with respect to the lift arm and knuckle joint so that the unit may be horizontally aligned while it is carried by or suspended from the lift arm above the ground surface.

In one embodiment, a pair of gauge wheels 116 may be mounted to reel mower cutting unit 100 at a position in front of front roller 102, at the front left corner and front right corner of the unit. The gauge wheels may be mounted using mounting brackets 118 that are fastened to the frame at the left and right ends of the unit. Each gauge wheel may be mounted at an angle directed away from the side of the cutting unit in the direction of travel, so that each gauge wheel axis 120 is not parallel to the axis of the cutting reel or front roller. Additionally, the mounting brackets may be positioned so that the gauge wheels clear the ground, and are preferably at least about 1 cm above the ground surface, once the front and rear rollers 102, 104 contact the ground in the mowing position. Each gauge wheel 116 may have rounded edges so that the gauge wheel may act as a fulcrum around which reel mower cutting unit 100 may pivot from a horizontal position toward a position parallel to the ground surface.

As shown in FIG. 2, reel mower cutting unit 100 may be lowered to sloped ground surface 124, and gauge wheel 116 may contact the surface before any other part of the unit. Because the gauge wheel initially contacts the ground surface, the unit does not leave any mark on the turf. After the gauge wheel contacts the surface, the gauge wheel then may roll up the slope until front roller 102 touches the ground surface and lifts the gauge wheel off the ground, as shown in FIG. 3. The gauge wheel also may prevent the reel mower cutting unit from sliding sideways after the gauge wheel makes contact, and may prevent any part of the unit from damaging the turf.

The invention claimed is:

1. A reel mower cutting unit, comprising:
   a horizontally aligned cutting reel mounted in a frame and rotating in proximity to a bedknife;
   a front roller forwardly of the cutting reel and a rear roller behind the cutting reel to support the cutting reel on the ground surface; and
   a pair of gauge wheels mounted to and extending laterally outwardly from the reel mower cutting unit on a fixed axis forwardly of and non-parallel to the front roller axis in a mowing position;
   the gauge wheel being ground-engaging until the front roller supports the reel mower cutting unit and raises the gauge wheel.

2. The reel mower cutting unit of claim 1 wherein each of the pair of gauge wheels have an axis that is fixed diagonally to the cutting reel.

3. The reel mower cutting unit of claim 1 wherein the pair of gauge wheels have rounded edges.

4. A reel mower cutting unit, comprising:
   a cutting reel having a horizontal axis and supported in a frame by a front roller and a rear roller in a mowing position;
   a lift arm to raise and lower the cutting reel between a mowing position and a transport position; and
   a pair of gauge wheels mounted forwardly of the front roller and extending laterally outwardly from a first end and a second end of the reel mower cutting unit at a left front corner and a right front corner of the frame, each gauge wheel mounted on a fixed axis that is non-parallel to the horizontal axis of the cutting reel and mounted in a position on the frame so that each gauge wheel may be ground-engaging only as the lift arm raises or lowers the cutting reel but is not ground-engaging when the front roller supports the cutting reel in the mowing position.

5. The reel mower cutting unit of claim 4 wherein each gauge wheel has rounded edges.

6. The reel mower cutting unit of claim 4 wherein each gauge wheel is mounted on an axis that is diagonal to the cutting reel.

7. The reel mower cutting unit of claim 4 further comprising a knuckle joint at the end of the lift arm to allow the unit to pivot on an axis parallel to the direction of travel.

8. A reel mower cutting unit, comprising:
   a cutting reel having a pair of gauge wheels mounted in front of the cutting reel; the cutting reel being supported by a front roller and a rear roller mounted on horizontal axes in a mowing position; each gauge wheel extending laterally outwardly from a front corner of the unit on a fixed axis that is diagonal to the cutting reel axis and positioned above the front and rear roller axes so that the pair of gauge wheels are raised in the mowing position.

9. The reel mower cutting unit of claim 8, further comprising a front roller in front of the cutting reel, and a rear roller behind the cutting reel.

10. The reel mower cutting unit of claim 9 wherein the front roller and rear roller contact the ground surface while the reel mower cutting unit is in a mowing position so that the gauge wheels are off the ground surface.

11. The reel mower cutting unit of claim 8 wherein each gauge wheel has rounded edges.

12. The reel mower cutting unit of claim 8 further comprising a lift arm pivotably mounted to a frame supporting the cutting reel.

* * * * *